(12) United States Patent
Kang et al.

(10) Patent No.: US 11,447,644 B2
(45) Date of Patent: Sep. 20, 2022

(54) ANTISTATIC POWDER COATING COMPOSITION

(71) Applicant: KCC CORPORATION, Seoul (KR)

(72) Inventors: Jun Tae Kang, Jeollabuk-do (KR); Byung Soo Moon, Jeollabuk-do (KR); Jin Tae Kim, Gyeonggi-do (KR); Chan Gi Kim, Gyeonggi-do (KR)

(73) Assignee: KCC CORPORATION, Seoul (KR)

( * ) Notice: Subject to any disclaimer, the term of this patent is extended or adjusted under 35 U.S.C. 154(b) by 268 days.

(21) Appl. No.: 16/754,491

(22) PCT Filed: Sep. 14, 2018

(86) PCT No.: PCT/KR2018/010803
§ 371 (c)(1),
(2) Date: Apr. 8, 2020

(87) PCT Pub. No.: WO2019/083164
PCT Pub. Date: May 2, 2019

(65) Prior Publication Data
US 2020/0392349 A1    Dec. 17, 2020

(30) Foreign Application Priority Data
Oct. 24, 2017   (KR) .......................... 10-2017-0138655

(51) Int. Cl.
| | | |
|---|---|---|
| *C09D 5/03* | (2006.01) | |
| *C09D 7/40* | (2018.01) | |
| *C09D 5/24* | (2006.01) | |
| *C09D 133/00* | (2006.01) | |
| *C09D 163/00* | (2006.01) | |
| *C09D 167/00* | (2006.01) | |

(52) U.S. Cl.
CPC .............. *C09D 5/032* (2013.01); *C09D 5/24* (2013.01); *C09D 7/70* (2018.01); *C09D 133/00* (2013.01); *C09D 163/00* (2013.01); *C09D 167/00* (2013.01)

(58) Field of Classification Search
CPC ...... C09D 5/24; C09D 133/00; C09D 163/00; C09D 167/00; C08K 3/041
See application file for complete search history.

(56) References Cited

U.S. PATENT DOCUMENTS

2004/0235984 A1*  11/2004  Nicholl ................ C09D 163/00
                                                                524/495

FOREIGN PATENT DOCUMENTS

| CN | 102408813 A | * | 4/2014 | .......... C09D 163/00 |
|---|---|---|---|---|
| CN | 106590367 A | | 4/2017 | |
| JP | 2016084423 A | | 5/2016 | |
| KR | 1020060077826 A | | 7/2006 | |
| KR | 1020070070602 A | | 7/2007 | |
| KR | 1020070109190 A | | 11/2007 | |
| KR | 20100033097 A | | 3/2010 | |
| KR | 1020110058269 A | | 6/2011 | |
| KR | 1020120006458 A | | 1/2012 | |
| KR | 20130074110 A | | 7/2013 | |

OTHER PUBLICATIONS

International Search Report from International Application No. PCT/KR2018/010803, dated Dec. 19, 2018, 5 pages.

* cited by examiner

*Primary Examiner* — Khanh T Nguyen
(74) *Attorney, Agent, or Firm* — Tucker Ellis LLP

(57) ABSTRACT

Provided is an antistatic powder coating composition, which includes single-walled carbon nanotubes (SWCNTs) having specific physical properties as a conductive additive, thereby providing an environmentally friendly coating exhibiting excellent coating workability and constantly demonstrating stable surface resistance, irrespective of the thickness of a film.

9 Claims, No Drawings

ANTISTATIC POWDER COATING COMPOSITION

TECHNICAL FIELD

The present invention relates to an antistatic powder coating composition.

BACKGROUND

A powder coating is a 100% solid coating without a diluent, such as a solvent or water, contained therein. The powder coating is used to form a film by undergoing a curing reaction taking place when it is coated on a substrate (typically a metal surface, for example) and heated to then be dissolved. Since the powder coating is in a powdery form without volatile components, it has recently gained growing attention as a pollution-free coating.

An antistatic powder coating allows an electric current to flow in a film by imparting electrical conductivity to the film. The antistatic powder coating eliminates static electricity generated by electrification, such as friction, thereby preventing shocks (shorts or ignition) from being induced to an electronic device/circuit. In addition, the antistatic powder coating can easily remove dust particles, so that it can be applied to precision industrial fields (e.g., semiconductors or displays) or ultrafine technologies (e.g., genetic engineering or biotechnology). In particular, since even an extremely small amount of static electricity or dust can give rise to fatal defects in high-technology industries, such as semiconductor, display or bio industries, a function of dissipating static charge is essentially required in all kinds of structures, instruments or flooring materials that are applied to the industries.

In a conventional antistatic powder coating, electrically conducting performance is imparted to the coating by simply mixing or melt-dispersing an electrically conductive pigment or an extender coated with an electrically conductive material as one of components of the powder coating. However, the conventional antistatic powder coating has several shortcomings. For example, the conventional antistatic powder coating cannot implement pure white coloring. In addition, since an electrically conductive material is insufficiently dispersed in the coating, electrical conductivity of the coating may be noticeably lowered in a case where the film has a thickness exceeding a prescribed range (100 μm). Moreover, since there is a possibility of static dissipating performance being reduced, it is not easy to achieve recovery-recycling and recoating of the powder coating, which are outstanding advantages provided by the powder coating.

To achieve static dissipating performance, an attempt to attach an antistatic sheet or film to a substrate with the conventional antistatic powder coating is presently being made. In this case, however, since an adhesive agent is employed in attaching the antistatic sheet or film to the substrate, releasability and solvent resistance may be unavoidably deteriorated after the use over an extended period of time. Hence it is not possible to semi-permanently use the powder coating, and additional processes for performing cutting, forming and attachment are required. Meanwhile, a solvent-type antistatic coating may also be applied to the substrate with the conventional antistatic powder coating. However, the use of the solvent-type antistatic coating may result in deterioration of the mechanical property, water resistance and corrosion resistance.

Therefore, there is an urgent need for development of an antistatic powder coating composition capable of demonstrating uniformity in performance without being affected by film thickness.

DISCLOSURE OF THE INVENTION

Problems to be Solved

The present invention provides an antistatic powder coating composition, which uses specific single-walled carbon nanotubes (SWCNTs), thereby constantly demonstrating stable resistance characteristics, irrespective of the thickness of a film, and which can be used semi-permanently and in an environmentally friendly manner by being easily recovered and recycled.

Means to Solve the Problems

The present invention provides an antistatic powder coating composition comprising, based on 100 parts by weight of the powder coating composition, 10 to 80 parts by weight of a binder resin, 0.1 to 80 parts by weight of a curing agent, 0.1 to 5 parts by weight of a curing accelerator, 1 to 60 parts by weight of a pigment, 1 to 60 parts by weight of an inorganic filler, and 0.0001 to 0.1 parts by weight of a conductive additive, wherein the conductive additive includes single-walled carbon nanotubes (SWCNTs) having a single wall proportion of not less than 80%.

Effects of the Invention

As described above, the specific SWCNTs are used as a conductive additive in the antistatic powder coating composition according to the present invention. Thus, when a coating film is formed using the corresponding powder coating composition, stable surface resistance characteristics of the cured film can be secured while easily controlling the surface resistance characteristics depending on film thickness.

In addition, the antistatic powder coating composition according to the present invention can be easily recovered, recycled and recoated and can exhibit a semi-permanent effect of dissipating static charges just by one time coating. Accordingly, the antistatic powder coating composition according to the present invention can be advantageously applied to overall advanced industrial fields, including semiconductors, displays, bio technology, and so on.

DETAILED DESCRIPTION TO EXECUTE THE INVENTION

Hereinafter, the present invention will be described in detail. However, the present invention is not limited to the following description and various components can be changed in various manners or can be selectively used in combination if necessary. Therefore, it should be understood that all changes, equivalents or alternatives are intended to be within the spirits and scope of the present invention.

<Antistatic Powder Coating Composition>

The antistatic powder coating composition according to the present invention includes a binder resin, a curing agent, a curing accelerator, a pigment, an inorganic filler and conductive additives, and may further include other additives that are commonly used in the field of powder coatings, if necessary. Components of the antistatic powder coating composition will now be described in detail.

Binder Resin

In the antistatic powder coating composition of the present invention, a component that can be used as a binder resin in the field of powder coatings can be used as a resin without limitation. Non-limiting examples of usable resins may include a polyester resin, an epoxy resin, an acryl resin, and so on, which can be used alone or in combination of two or more resins.

As the polyester resin, a resin commonly known in the related field may be used. For example, the polyester resin is a bifunctional resin including a carboxyl group and a hydroxyl group, the carboxyl group having an acid value of 5 to 80 mgKOH/g, and the hydroxy group having an acid value of 5 to 80 mgKOH/g. In addition, the polyester resin may have a melting viscosity of 2,000 to 5,000 cps (200° C.) and a glass transition temperature (Tg) of 50 to 70° C. The polyester resin having the aforementioned properties has improved mechanical properties and durability, thereby obtaining good film characteristics.

When the acid value of the carboxyl group of the polyester resin is less than 5 mgKOH/g, the reactivity may be lowered, thereby deteriorating physical properties, such as impact resistance, extendability or flexibility, and weatherability, lowering a crosslinking density of the film. When the acid value of the carboxyl group of the polyester resin is greater than 80 mgKOH/g, a curing reaction speed may be increased, thereby resulting in poor appearance and low storage stability of the film. Meanwhile, when the acid value of the hydroxyl group of the polyester resin is less than 5 mgKOH/g, mechanical properties of the polyester resin may be deteriorated, and when the acid value of the hydroxyl group of the polyester resin is greater than 80 mgKOH/g, the appearance and storage stability of the film may be deteriorated.

When the melting viscosity of the polyester resin is less than 2,000 cps (200° C.), the coating may not be properly cured, and when the melting viscosity of the polyester resin is greater than 5,000 cps (200° C.), the appearance of the film may be deteriorated. In addition, when the glass transition temperature of the polyester resin is lower than 50° C., the storage stability may be lowered, and when the glass transition temperature of the polyester resin is higher than 70° C., the melting dispersibility of the coating may be lowered.

As the epoxy resin, a resin commonly known in the related field may be used. Non-limiting examples of usable epoxy resin may include a bisphenol A epoxy resin, a bisphenol F epoxy resin, a bisphenol S epoxy resin, a naphthalene epoxy resin, an anthracene epoxy resin, a biphenyl epoxy resin, a tetramethyl biphenyl epoxy resin, a bisphenol A novolac epoxy resin, a bisphenol S novolac epoxy resin, a cresol novolac epoxy resin, a phenol novolac epoxy resin, a biphenyl novolac epoxy resin, a naphthol novolac epoxy resin, a naphthol-phenol cocondensate novolac epoxy resin, a naphthol-cresol cocondensate novolac epoxy resin, an aromatic hydrocarbon formaldehyde resin modified phenol resin type epoxy resin, a triphenyl methane epoxy resin, a tetraphenyl ethane epoxy resin, a dicyclopentadiene phenol addition reaction type epoxy resin, a phenol aralkyl epoxy resin, a multi-functional phenol resin, a naphthol aralkyl epoxy resin, and combinations thereof.

The epoxy resin may have an epoxy equivalent weight (EEW) of 100 to 3,000 g/eq. The epoxy resin may be a bisphenol A epoxy resin, a bisphenol F epoxy resin and/or a novolac epoxy resin having an EEW of 100 to 3,000 g/eq.

As the acryl resin, a resin commonly known in the related field may be used. For example, the acryl resin may include a hydroxyl group and an epoxy group, the epoxy group having an EEW of 400 to 700 g/eq. In addition, the acryl resin may have an acid value of the hydroxyl group of 30 to 70 mgKOH/g, a glass transition temperature (Tg) of 40 to 80° C., and a melting viscosity of 1,000 to 3,000 cps (200° C.).

When the EEW of the acryl resin is greater than 700 g/eq, the crosslinking density may be lowered, thereby deteriorating contamination resistance and solvent resistance. When the EEW of the acryl resin is less than 400 g/eq, the reaction speed may be increased, thereby resulting in poor appearance. In addition, when the acid value of the hydroxyl group of the acryl resin is less than 30 mgKOH/g, physical properties and contamination resistance may be deteriorated. When the acid value of the hydroxyl group of the acryl resin is greater than 70 mgKOH/g, the appearance and storage stability may be deteriorated. Meanwhile, when the melting viscosity of the acryl resin is less than 1,000 cps (200° C.), the coating may not be properly cured. When the melting viscosity of the acryl resin is greater than 3,000 cps (200° C.), the appearance of the film may be deteriorated.

In the present invention, at least two or more selected from the polyester resin, the epoxy resin and the acryl resin may be used in combination. In this case, the ratio of the resins used may not be particularly limited but may be appropriately adjusted. For example, a mixture of the polyester resin and the epoxy resin mixed in a weight ratio of 4:6 to 7:3 may be used. When the mixture ratio deviates from the range specified above, the leveling, mechanical and electrical properties may be deteriorated.

The amount of the binder resin according to the present invention is not particularly limited. For example, based on 100 parts by weight of the powder coating composition, the binder resin may be used in an amount of 10 to 80 parts by weight or 20 to 70 parts by weight. When the amount of the binder resin is lower than the range specified above, the mechanical properties of the film may be deteriorated, and when the amount of the binder resin is higher than the range specified above, the workability of the coating process may be lowered.

Curing Agent

In the antistatic powder coating composition according to the present invention, a curing agent commonly known in the related field may be used without limitation as long as it can be used to carry out a curing reaction with a binder resin.

Non-limiting examples of usable curing agents may include a triglycidyl isocyanate curing agent, a hydroxyl alkyl amide curing agent, a phenolic curing agent, a dicyan diamide-based curing agent, an epoxy-based curing agent, an urethane-based curing agent, a polyester-based curing agent and an acid-based curing agent. These curing agents may be used alone or in combination of two or more curing agents.

The amount of the curing agent used is not particularly limited. In an example embodiment, based on 100 parts by weight of the powder coating composition, the curing agent may be used in an amount of 0.1 to 80 parts by weight. In an alternative example embodiment, based on 100 parts by weight of the powder coating composition, the curing agent may be used in an amount of 0.5 to 60 parts by weight. When the amount of the curing agent is lower than the range specified above, the properties of the film may be deteriorated due to a reduction in the degree of cure, and when the amount of the curing agent is higher than the range specified above, the properties of the film may be deteriorated due to the presence of an unreacted curing agent.

Curing Accelerator

In the antistatic powder coating composition according to the present invention, a component commonly known in the related field may be used as a curing accelerator without limitation. The curing accelerator is a material that accelerates a reaction between the binder resin and the curing agent. Examples of usable curing accelerator may include imidazole, imidazole modified epoxy, DBU (1,8-DiazaBicyclo[5,4,0]Undec-7-ene), DBU salt, triphenyl phosphine, mercapto benzocyazole, a metal-based curing accelerator and mixtures thereof.

Non-limiting examples of usable imidazole-based curing accelerators may include, imidazole, 2-methyl imidazole, 2-ethyl imidazole, 2-decyl imidazole, 2-hexyl imidazole, 2-isopropyl imidazole, 2-undecyl imidazole, 2-hepta decyl imidazole, 2-ethyl-4-methyl imidazole, 2-phenyl imidazole, 2-phenyl-4-methyl imidazole, 1-benzyl-2-methyl imidazole, 1-benzyl-2-phenyl imidazole, 1-cyanoethyl-2-methyl imidazole, 1-cyanoethyl-2-ethyl-4-methyl imidazole, 1-cyanoethyl-2-undecyl imidazole, 1-cyanoethyl-2-phenyl imidazole, 1-cyanoethyl-2-undecyl imidazole trimelitate, 1-cyanoethyl-2-phenyl imidazole trimelitate, 2,4-diamino-6-(2'-methylimidazole-(1')-ethyl-s-triazine, 2-phenyl-4,5-dihydroxymethyl imidazole, 2-phenyl-4-methyl-5-hydroxymethyl imidazole, 2-phenyl-4-benzyl-5-hydroxymethyl imidazole, 4,4'-methylene-bis-(2-ethyl-5-methyl imidazole), 2-aminoethyl-2-methyl imidazole, 1-cyanoethyl-2-phenyl-4,5-di(cyanoethoxymethyl) imidazole, 1-dodecyl-2-methyl-3-benzylimidazolinium chloride, imidazole containing polyimide, mixtures thereof, and so on. Additionally, a tertiary amine, an organometallic compound, an organophosphorous compound, a boron compound, or the like may be further used.

Examples of the metal-based curing accelerator may include, but not limited to, an organic metal complex of a metal, such as cobalt, copper, zinc, iron, nickel, manganese, tin or the like, or an organic metal salt. Non-limiting examples of the organic metal complex may include: organic cobalt complexes such as cobalt (II) acetylacetonate, cobalt (III) acetylacetonate and the like; organic copper complexes such as copper (II) acetylacetonate and the like; organic zinc complexes such as zinc (II) acetylacetonate and the like; organic iron complexes such as iron (III) acetylacetonate and the like; organic nickel complexes such as nickel (II) acetylacetonate and the like; and organic manganese complexes such as manganese (II) acetylacetonate and the like. Non-limiting examples of the organic metal salt may include, but not limited to, zinc octylate, tin octylate, zinc naphthenate, cobalt naphthenate, tin stearate, zinc stearate and the like. These metal-based curing accelerators may be used alone or in combination of two or more curing accelerators.

In the present invention, the amount of the curing accelerator used may be appropriately adjusted according to the reactivity between the binder resin and the curing agent. In an example embodiment, based on 100 parts by weight of the powder coating composition, the curing accelerator may be used in an amount of 0.1 to 5 parts by weight. In an alternative example embodiment, based on 100 parts by weight of the powder coating composition, the curing accelerator may be used in an amount of 0.1 to 3 parts by weight. When the amount of the curing accelerator deviates from the range specified above, the physical properties of the film may be deteriorated.

Pigment

In the antistatic powder coating composition according to the present invention, a pigment may be used in combination with a binder resin for the purpose of rendering a desired color to the powder coating.

As the pigment, an organic pigment, an inorganic pigment, a metallic pigment, Al-paste, pearl, an extender pigment, and the like, which are commonly used in the field of powder coatings, may be used without limitation. These pigments may be used alone or in combination of two or more pigments. Non-limiting examples of usable pigments may include an azo-based pigment, a phthalocyanine-based pigment, an iron oxide-based pigment, a cobalt-based pigment, a carbonate-based pigment, a sulfate-based pigment, a silicate-based pigment, a chromate-based colored pigment, and the like. Specific examples of the usable pigments may include one or more mixtures selected from the group consisting of titanium dioxide, zinc oxide, bismuth vanadate, cyanine green, carbon black, iron oxide red, iron oxide yellow, navy blue, and cyanine blue.

In the present invention, the amount of the pigment used may be in the range of 1 to 60 parts by weight based on 100 parts by weight of the powder coating composition. Alternatively, the pigment may be used in an amount of 1 to 50 parts by weight, based on 100 parts by weight of the powder coating composition. When the amount of the pigment used deviates from the range specified above, the opacity of the film employing the powder coating composition according to the present invention may not be sufficiently high, and the color expression of the coating may be insignificant. Moreover, the physical properties of the film may be deteriorated.

Inorganic Filler

In the antistatic powder coating composition according to the present invention, any inorganic filler that can be commonly employed to the powder coating in the related field may be used as the inorganic filler without limitation.

Non-limiting examples of usable inorganic fillers may include calcium carbonate, feldspar, barium sulfate, silica, alumina hydroxide, magnesium hydroxide, titanium dioxide, magnesium carbonate, alumina, mica, montmorillonite, wollastonite, talc, aluminum nitride, silicon nitride, boron nitride, aluminum oxide, and the like. These inorganic fillers may be used alone or in combination of two or more materials.

The average particle size of the inorganic filler is not particularly limited. In an example embodiment, the average particle size of the inorganic filler may be in the range of 1 to 20 μm. In addition, the shape of the inorganic filler may be spherical or amorphous, but not limited thereto.

The amount of the inorganic filler used may be in the range of 1 to 60 parts by weight, based on 100 parts by weight of the powder coating composition. Alternatively, the amount of the inorganic filler used may be in the range of 1 to 50 parts by weight, based on 100 parts by weight of the powder coating composition. When the amount of the inorganic filler used deviates from the range specified above, the physical properties, impact resistance, adhesive strength of the film may be deteriorated.

Conductive Additive

In the conventional antistatic powder coating, a conductive additive, such as carbon fiber, graphite, tin coated titanium oxide, aluminum paste, carbon black, or the like, is typically used. In this case, however, the use of such a conductive additive results in a dark color expression, like black or gray, and it is difficult to implement a variety of colors. Specifically, in a case of a powder coating having tin coated titanium oxide and aluminum paste mixed therein, when a film thickness is greater than 100 μm, the electrical conductivity of the coating may be lowered. The electrical conductivity of carbon fibers used as a conductive additive is greatly affected by the film thickness, making surface resistance of the film uncontrollable. When the carbon fibers are used in excess, the leveling property may be deteriorated.

In the present invention, in order to provide an antistatic powder coating which can easily control the surface resistance of a film and can constantly demonstrate stable resistance characteristics, irrespective of film thickness, single-walled carbon nanotubes (SWCNTs) having specific properties are used as a conductive additive.

The SWCNTs generally have better electrical properties than double-walled carbon nanotubes (DWCNTs), multi-walled carbon nanotubes (MWCNTs), carbon black, carbon fiber, or the like. Therefore, a significant effect can be obtained by using only a small amount of the SWCNTs. However, in view of characteristics of nanomaterials having a tendency to agglomerate readily, it is quite important to secure homogeneous dispersibility in the coating.

In particular, the SWCNTs are not soluble in any kind of solvents and has strong cohesion, making it difficult to exhibit desirable electrical properties. Accordingly, in order to use the SWCNTs for a liquid coating, attempts to covalently attach the liquid coating to the SWCNTs have been made using high-energy ultrasonic pyrolysis or a chemical process. In this case, however, damages may be caused to the SWCNTs, resulting in truncation of CNTs. The truncated CNTs may have a reduced aspect ratio. In order to maximally utilize electrical conductivity of the SWCNTs, a relatively large aspect ratio is required. Therefore, it is necessary to homogenously disperse the SWCNTs while minimizing the reduction of the aspect ratio.

In the present invention, the SWCNTs are used as an electrically conductive additive of a non-solvent type powder coating, and physical properties of the SWCNTs, including, for example, an average length, a diameter, an aspect ratio, a single wall proportion, and so on, are controlled to be in specified ranges, thereby constantly demonstrating stable surface resistance characteristics without being affected by film thickness, while solving a problem of non-homogenous dispersion encountered with the conventional CNTs.

In an example embodiment, the average length of the SWCNTs may be in the range of 1 to 20 μm. In an alternative example embodiment, the average length of the SWCNTs may be in the range of 2 to 15 μm. In an example embodiment, the diameter of the SWCNTs may be in the range of 0.5 to 10.0 nm. In an alternative example embodiment, the diameter of the SWCNTs may be in the range of 1.0 to 3.0 nm. In addition, in an example embodiment, the aspect ratio (average length/diameter) may be not less than 100,000, the single wall proportion may be not less than 80%, and the carbon proportion may be not less than 90%.

When the average length, diameter and aspect ratio of the SWCNTs deviate from the ranges specified above, the cured film formed from the powder coating may have non-homogenous surface resistance and the surface resistance of the film may be lowered. Here, in order for the coating to demonstrate the uniform electrical conductivity, it is necessary to increase the amount of the SWCNTs, making it impossible to implement white and pale yellow coloring in the powder coating. In addition, when the single wall proportion of the SWCNTs is less than 80% or when the carbon proportion of the SWCNTs is less than 90%, the electrical conductivity may be lowered and non-homogenous surface resistance characteristics may be exhibited.

The amount of the SWCNTs may be appropriately adjusted in consideration of the surface resistance of a desired cured film. In an example embodiment, the amount of the SWCNTs may be in the range of 0.0001 to 0.1 parts by weight, based on 100 parts by weight of the powder coating composition. In an alternative example embodiment, the amount of the SWCNTs may be in the range of 0.001 to 0.05 parts by weight, based on 100 parts by weight of the powder coating composition. When the amount of the SWCNTs deviates from the range specified above, it is difficult to demonstrate desired stable surface resistance characteristics of a film.

In the present invention, the surface resistance of the cured film can be freely controlled to be in the range of 10 to $10^{10} \Omega$ by adjusting the amount of the SWCNTs.

Additives

The antistatic powder coating composition according to the present invention may selectively further include additives that are commonly used in the field of powder coatings within a range in which inherent characteristics of the powder composition are not impaired.

Examples of additives useful in the present invention may include a matting agent, a structure pattern shaping agent, a Hammertone pattern shaping agent, a dispersant, a leveling agent, a flow improver, a pinhole eliminator, an anti-cratering agent, a coupling agent, a gloss modifier, an adhesion improver, a flame retardant, an UV absorbent, or mixtures of these additives.

The additive may be appropriately added in an amount within the range commonly known in the related field. In an example embodiment, the amount of the additive may be in the range of 0.1 to 20 parts by weight, based on 100 parts by weight of the powder coating composition.

As described above, the antistatic powder coating composition according to the present invention may be embodied in various manners. According to a specific example embodiment, the antistatic powder coating composition may comprise, based on 100 parts by weight of the powder coating composition, 10 to 80 parts by weight of one or more resins selected from the group consisting of a polyester resin, an epoxy resin and an acryl resin, 0.1 to 80 parts by weight of a curing agent, 0.1 to 5 parts by weight of a curing accelerator, 1 to 60 parts by weight of a pigment, 1 to 60 parts by weight of an inorganic filler, and 0.0001 to 0.1 parts by weight of SWCNTs.

In the antistatic powder coating composition according to the present invention, an average particle size of the powder may be in the range of 10 to 100 μm. However, the average particle size of the coating is not limited to the range specified herein and may be appropriately adjusted within the range commonly known in the related field.

A method of preparing the antistatic powder coating composition according to the present invention is not particularly limited. According to a specific example embodiment, the preparing method may comprise a first step of inputting into a container mixer a raw material mixture including one or more binder resins selected from the group consisting of a polyester resin, an epoxy resin and an acryl resin, a curing agent, a curing accelerator, a pigment, an inorganic filler and a conductive additive, and homogenously mixing the same, and a second step of melt-mixing the mixed composition and pulverizing the resulting product.

In the second step, the raw material mixture may be melt-dispersed using a melt-kneading device, such as a kneader or an extruder at a temperature of 70 to 130° C. to fabricate a chip having a predetermined thickness, and the fabricated chip may be pulverized to have particle sizes in the range of 10 to 120 μm using a pulverizer, such as a high-speed mixer to then classify the particle sizes, thereby preparing the powder coating composition. The classifying process is not particularly limited. For example, the classifying process may be performed by filtering the particles using a 40 to 200 mesh filter. Alternatively, the classifying process may be performed by filtering the particles using a 100 to 200 mesh filter. Accordingly, the powder coating having an average particle size in the range of 10 to 100 μm can be obtained.

In the present invention, particle surfaces of the powder coating may be coated with powder, such as silica, thereby improving flowability. For this treatment, a pulverizing mixing process of mixing with the powder added during pulverizing or a dry mixing process using a Henschel mixer may be employed.

As described above, the powder coating composition according to the present invention is capable of implementing a variety of colors and controlling the electrical conductivity of the coating film according to input amounts and demonstrates stable surface resistance without being affected by film thickness. In addition, compared to the conventional solvent-type antistatic coating, the powder coating according to the present invention has excellent mechanical strength and durability. Moreover, since it is not necessary to additionally use an antistatic film or sheet, adhesion/cutting processes can be omitted. In addition, the powder coating composition according to the present invention has excellent abrasion resistance.

Hereinafter, the present invention will be described in further details through Examples. However, the following Examples are provided only for a better understanding of the present invention and the scope of the present invention is not limited to the following Examples in any sense.

Examples 1-5

The respective components were input to a mixing tank according to the formulations listed in Table 1 to be subjected to pre-mixing, and then melt-dispersed using a disperser at a temperature of 100° C., thereby fabricating chips. The fabricated chips were pulverized using a high-speed mixer and then filtered to have an average particle size of 32 to 48 micron, thereby preparing powder coating compositions of Examples 1 to 5. In Table 1, the amount unit of each component is part by weight.

Comparative Examples 1-2

According to the formulations listed in Table 1, powder coating compositions of Comparative Examples 1 and 2 were prepared by the same method as in Examples 1 to 5.

TABLE 1

| Component | | Ex. 1 | Ex. 2 | Ex. 3 | Ex. 4 | Ex. 5 | Comp Ex. 1 | Comp Ex. 2 |
|---|---|---|---|---|---|---|---|---|
| Polyester resin | | 63 | 33 | 33 | 33 | — | 33 | 33 |
| Epoxy resin | | — | 33 | 33 | 33 | 63 | 33 | 33 |
| Curing agent | | 4.5 | 0.2 | 0.2 | 0.2 | 1 | — | — |
| Curing accelerator | | 0.1 | 0.1 | 0.1 | 0.1 | 0.1 | 0.1 | 0.1 |
| Colored pigment | | 9.5 | 6.9 | 6.9 | 6.9 | 6.9 | 6.9 | 6.9 |
| Inorganic filler | | 20 | 24 | 24 | 24 | 25 | 25 | 25 |
| Additives | | 2.9 | 2.8 | 2.8 | 2.8 | 4.0 | 2.0 | 2.0 |
| Single-walled carbon nanotube (SWCNT) | Single wall proportion: 80% | 0.01 | 0.001 | 0.01 | 0.05 | 0.01 | — | — |
| | Single wall proportion: 40% | — | — | — | — | — | 0.1 | — |
| Multi-walled carbon nanotube (MWCNT) | | — | — | — | — | — | — | 0.1 |

1) Polyester resin: CNF36449 (KCC Corp., acid value: 49 mgKOH/g)
2) Epoxy resin: CNE80303 (KCC Corp., EEW: 810 g/eq)
3) Curing agent: TGIC (Huntsman Corp.)
4) Curing accelerator: 2-Phenyl-2-imidazoline (BESTAGON B-31, Evonik Ind.)
5) Colored pigment: Titanium dioxide (R-60, Ninbo Xinfu Co., Ltd.)
6) Inorganic filler: Limestone (OMYACARB 1, OMYA GmbH)
7) Additives: CERAFLOUR 960 (BYK) and BENZOIN (Miwon Co., Ltd.) (Weight ratio of 1:1)
8) Single-walled carbon nanotube (SWCNT): SWCNT (OCSiAl Corp)
9) Multi-walled carbon nanotube (MWCNT): CM-280 (Hanwha Chemical Corp.)

Experimental Example: Evaluation of Properties

To measure properties of powder coating compositions prepared in Examples 1 to 5 and Comparative Examples 1 to 2, each of the powder coating compositions was coated on a 0.7 mm cold-rolled steel sheet and then cured under the conditions of 180° C. (based on the metal surface temperature) and 14 minutes. Here, in order to evaluate the influence of film thickness, test pieces were fabricated to have thicknesses of 50 to 60 μm, 80 to 90 μm, 120 to 140 μm, 190 to 210 μm, 290 to 310 μm and 390 to 410 μm, respectively, and surface resistance of each test piece was measured in the following manner.

[Measurement of Surface Resistance]

Standard: ASTM F 150

Instrument: IR4052 (HIOKI E.E. Corporation)

Method: Using two electrode rods (2.27 kg, 63.5 mm in diameter) with 50 V

When the surface resistance exceeded an upper limit of measurement, i.e., $10^{12}$ ohms, the result was marked by "unmeasurable".

TABLE 2

| | Surface resistance (MΩ) | | | | | | |
|---|---|---|---|---|---|---|---|
| | Ex. 1 | Ex. 2 | Ex. 3 | Ex. 4 | Ex. 5 | Comp. Ex. 1 | Comp. Ex. 2 |
| Film thickness (μm) 50-60 | 0.128 | 76 | 0.131 | 0.051 | 0.150 | Unmeasurable | Unmeasurable |
| 80-90 | 0.126 | 81 | 0.146 | 0.048 | 0.149 | | |
| 120-140 | 0.131 | 84 | 0.141 | 0.044 | 0.144 | | |
| 190-210 | 0.143 | 77 | 0.138 | 0.050 | 0.143 | | |
| 290-310 | 0.125 | 79 | 0.150 | 0.048 | 0.159 | | |
| 390-410 | 0.133 | 79 | 0.144 | 0.049 | 0.147 | | |

Example 1 shows a powder coating composition using a polyester resin as a binder resin, Examples 2 to 4 show powder coating compositions using epoxy-polyester hybrid resins as binder resins, and Example 5 shows a powder coating composition using an epoxy resin as a binder resin, respectively. As shown in Table 2, uniform surface resistance characteristics were demonstrated, irrespective of the formulation of the binder resin used, and the surface resistance characteristics were constantly maintained even when film thicknesses were varied.

Examples 2 to 4 show powder coating compositions prepared by varying the amount of SWCNTs. In Example 2 in which 0.001 parts by weight of SWCNTs were added, the powder coating composition demonstrated surface resistance of 76 to 84 MΩ. In Example 3 in which 0.01 parts by weight of SWCNTs were added, the powder coating composition demonstrated surface resistance of 0.131 to 0.150 MO. In Example 4 in which 0.05 parts by weight of SWCNTs were added, the powder coating composition demonstrated surface resistance of 0.044 to 0.051 MO. As such, as the amount of the SWCNTs increases, the surface resistance of the powder coating decreases, suggesting that the amount of the SWCNTs is inversely proportional to the surface resistance of the powder coating.

Comparative Example 1 shows a powder coating composition prepared by adding SWCNTs having a single wall proportion of 40%. In Comparative Example 1, the SWCNTs were added in an amount of 0.1 parts by weight, which is an excessive amount, compared to the SWCNT amounts (0.001 to 0.05 parts by weight) in Examples 1 to 5. Nevertheless, the surface resistance exceeded the upper limit of measurement, i.e., $10^{12}$ ohms. Accordingly, it was confirmed that electrically conducting performance of the coating was not demonstrated.

Comparative Example 2 shows a powder coating composition prepared by adding multi-walled carbon nanotubes (MWCNTs). In Comparative Example 2, the MWCNTs were added in an amount of 0.1 parts by weight, which is an excessive amount, compared to the SWCNT amounts (0.001 to 0.05 parts by weight) in Examples 1 to 5. Nevertheless, the surface resistance exceeded the upper limit of measurement, i.e., $10^{12}$ ohms. Accordingly, it was confirmed that electrically conducting performance of the coating was not demonstrated.

As described above, it was confirmed that the surface resistance of a cured film formed from the powder coating composition according to the present invention could be easily controlled to a user's desired level and the controlled surface resistance could be stably secured, irrespective of the thickness of the cured film.

INDUSTRIAL APPLICABILITY

When a coating film is formed using the antistatic powder coating composition according to the present invention, stable surface resistance characteristics of the cured film can be secured while easily controlling the surface resistance characteristics depending on film thickness. In addition, the antistatic powder coating composition according to the present invention can be easily recovered, recycled and recoated and can exhibit a semi-permanent effect of dissipating static charges just by one time coating. Accordingly, the antistatic powder coating composition according to the present invention can be advantageously applied to overall advanced industrial fields, including semiconductors, displays, bio technology, and so on.

What is claimed is:

1. An antistatic powder coating composition comprising, based on 100 parts by weight of the powder coating composition, 10 to 80 parts by weight of a binder resin, 0.1 to 80 parts by weight of a curing agent, 0.1 to 5 parts by weight of a curing accelerator, 1 to 60 parts by weight of a pigment, 1 to 60 parts by weight of an inorganic filler, and 0.0001 to 0.1 parts by weight of a conductive additive,
wherein the conductive additive includes single-walled carbon nanotubes (SWCNTs).

2. The antistatic powder coating composition of claim 1, wherein the SWCNTs have an average length of 1 to 20 μm, a diameter of 0.5 to 10.0 nm, and an aspect ratio (average length/diameter) of not less than 100,000.

3. The antistatic powder coating composition of claim 1, wherein the binder resin is one or more selected from the group consisting of a polyester resin, an epoxy resin and an acryl resin.

4. The antistatic powder coating composition of claim 3, wherein the polyester resin is a bifunctional resin including a carboxyl group and a hydroxyl group, the carboxyl group having an acid value of 5 to 80 mgKOH/g and the hydroxyl group having an acid value of 5 to 80 mgKOH/g.

5. The antistatic powder coating composition of claim 3, wherein the epoxy resin has an epoxy equivalent weight of 100 to 3,000 g/eq.

6. The antistatic powder coating composition of claim 3, wherein the acryl resin includes a hydroxyl group and an epoxy group and has an epoxy equivalent weight of 400 to 700 g/eq.

7. The antistatic powder coating composition of claim 1, wherein the curing agent is one or more selected from the group consisting of a triglycidyl isocyanate curing agent, a hydroxyl alkyl amide curing agent, a phenolic curing agent, a dicyan diamide-based curing agent, an epoxy-based curing agent, an urethane-based curing agent, a polyester-based curing agent and an acid-based curing agent.

8. The antistatic powder coating composition of claim 1, wherein the curing accelerator is one or more materials selected from the group consisting of imidazole, imidazole modified epoxy, DBU (1,8-DiazaBicyclo[5,4,0]Undec-7-ene), a DBU salt, triphenyl phosphine, mercapto benzocyazole and a metal-based curing accelerator.

9. The antistatic powder coating composition of claim 1, further comprising one or more additives selected from the group consisting of a matting agent, a structure pattern shaping agent, a Hammertone pattern shaping agent, a dispersant, a leveling agent, a flow improver, a pinhole eliminator, an anti-cratering agent, a coupling agent, a gloss modifier, an adhesion improver, a flame retardant and an UV absorbent.

* * * * *